(12) United States Patent
Wu et al.

(10) Patent No.: US 9,063,311 B2
(45) Date of Patent: Jun. 23, 2015

(54) OPTICAL FIBER CONNECTOR AND OPTICAL FIBER COUPLING ASSEMBLY HAVING SAME

(75) Inventors: Kai-Wen Wu, New Taipei (TW); Yi-Zhong Sheu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 675 days.

(21) Appl. No.: 13/336,011

(22) Filed: Dec. 23, 2011

(65) Prior Publication Data
US 2013/0121649 A1 May 16, 2013

(30) Foreign Application Priority Data
Nov. 11, 2011 (TW) .............................. 100141181 A

(51) Int. Cl.
*G02B 6/36* (2006.01)
*G02B 6/42* (2006.01)
*G02B 6/38* (2006.01)

(52) U.S. Cl.
CPC ............ *G02B 6/4292* (2013.01); *G02B 6/3817* (2013.01)

(58) Field of Classification Search
None
See application file for complete search history.

(56) References Cited

U.S. PATENT DOCUMENTS

| 7,441,965 B2* | 10/2008 | Furuno et al. ................... 385/93 |
| 8,376,633 B2* | 2/2013 | Nishimura et al. ............. 385/88 |
| 2009/0052836 A1* | 2/2009 | Hodge ............................ 385/14 |

* cited by examiner

*Primary Examiner* — Uyen Chau N Le
*Assistant Examiner* — John M Bedtelyon
(74) *Attorney, Agent, or Firm* — Novak Druce Connolly Bove + Quigg LLP

(57) ABSTRACT

An optical fiber connector includes a body, a photoelectric conversion module received in the body, a receiving member, and two L-shaped optical fibers. The photoelectric conversion module includes a base, a light emitting unit, and a light receiving unit. The light emitting unit and the light receiving unit are mounted on the base. The receiving member is disposed over the light emitting unit and the light receiving unit and defines two L-shaped receiving holes. The optical fibers are received in the respective receiving holes. One end of one of the two optical fibers is optically aligned and coupled with the light emitting unit. One end of the other optical fiber is optically aligned and coupled with the light receiving unit.

10 Claims, 5 Drawing Sheets

OPTICAL FIBER CONNECTOR AND OPTICAL FIBER COUPLING ASSEMBLY HAVING SAME

BACKGROUND

1. Technical Field

The present disclosure relates to an optical fiber connector and an optical fiber coupling assembly having such an optical fiber connector.

2. Description of Related Art

An optical fiber coupling assembly is preferred for use in data transmission between many electronic devices due to its high transmission speed and signal integrity. Generally, the optical fiber coupling assembly includes a first optical fiber connector and a second optical fiber connector coupled with the first optical fiber connector. Each optical fiber connector includes a light emitting unit, a coupling lens, a number of optical lenses, a number of optical fibers aligned with the respective optical lenses, and a light receiving unit.

When in use, the first optical fiber connector is inserted into and coupled with the second optical fiber connector. If the first optical fiber connector is used as a signal emitting terminal, light emitting from a first light emitting unit passes through a first coupling lens, a first optical fiber, a first optical lens, a second optical lens, a second optical fiber, and a second coupling lens and is received by a second light receiving unit. In this light path, the first coupling lens is positioned between the first light emitting unit and the first optical fiber and configured for reflecting the light from the first light emitting towards the first optical fiber. The second coupling lens is positioned between the second optical fiber and the second light receiving unit and configured for reflecting the light from the second optical fiber towards the second light receiving unit.

However, the first coupling lens may reflect the light from the first light emitting unit out of the first optical fiber, thereby decreasing the optical coupling efficiency between the first light emitting unit and the first optical fiber. The second coupling lens may reflect the light from the second optical fiber out of the second light receiving unit, thereby decreasing the optical coupling efficiency between the second optical fiber and the second light emitting unit.

Therefore, it is desirable to provide an optical fiber connector and an optical fiber coupling assembly having the optical fiber connector, which can overcome or alleviate the above-mentioned problems.

DETAILED DESCRIPTION

Figure 1:
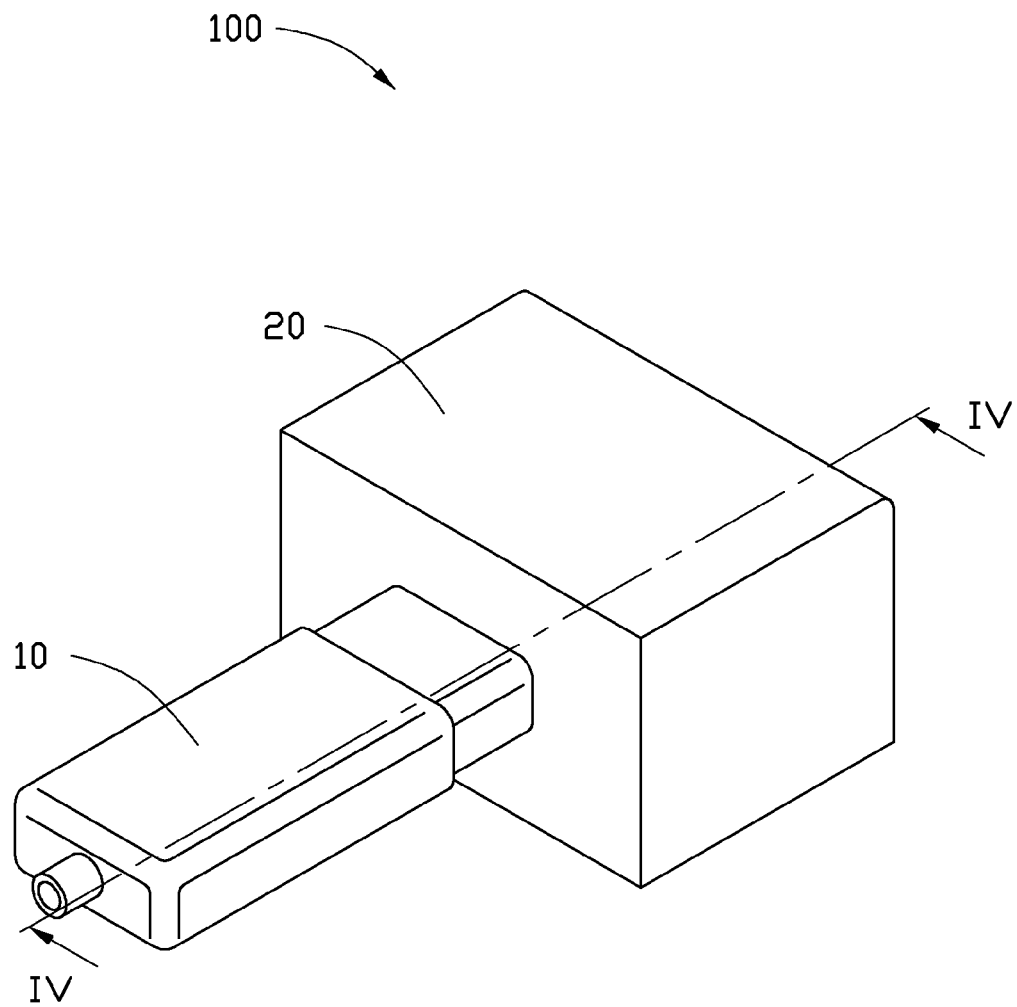
FIG. 1 is an isometric view of an optical fiber coupling assembly, according to an exemplary embodiment.
Figure 2:
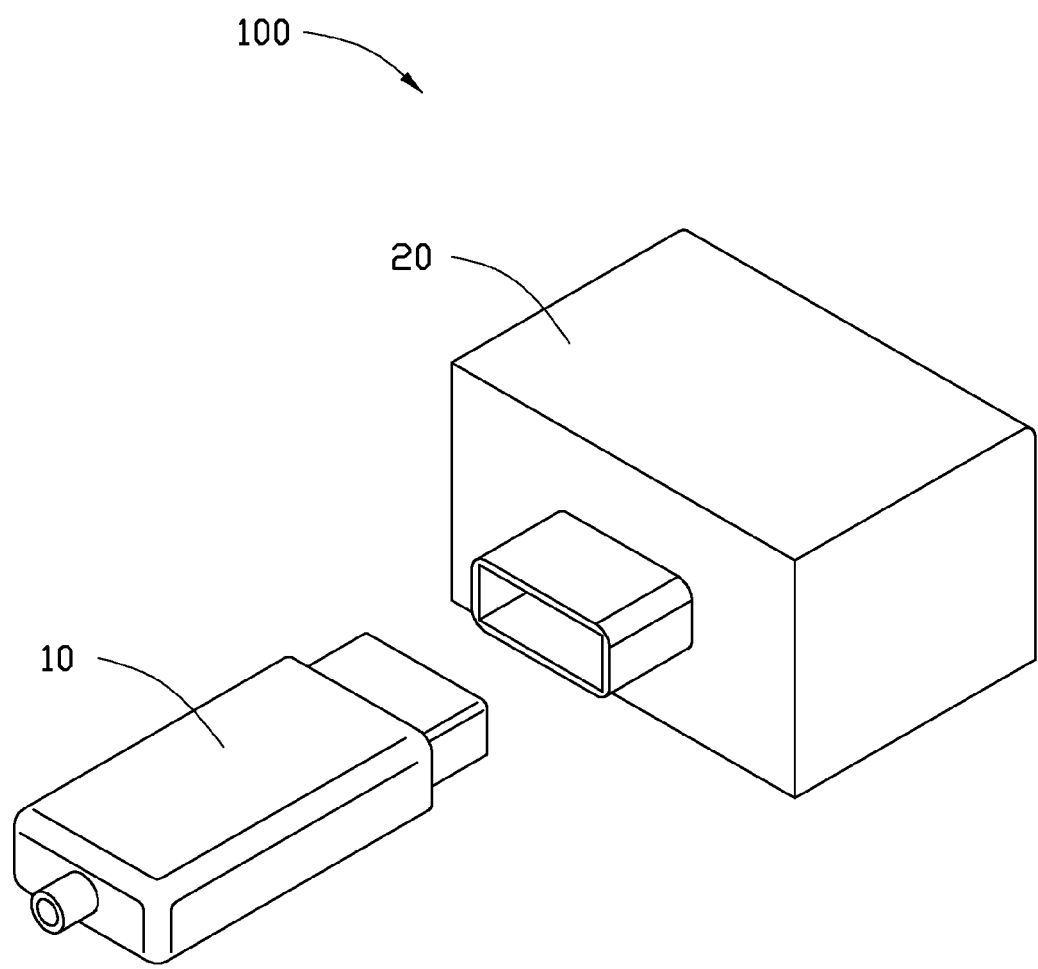
FIG. 2 is a disassembled view of the optical fiber coupling assembly of FIG. 1.
Figure 3:
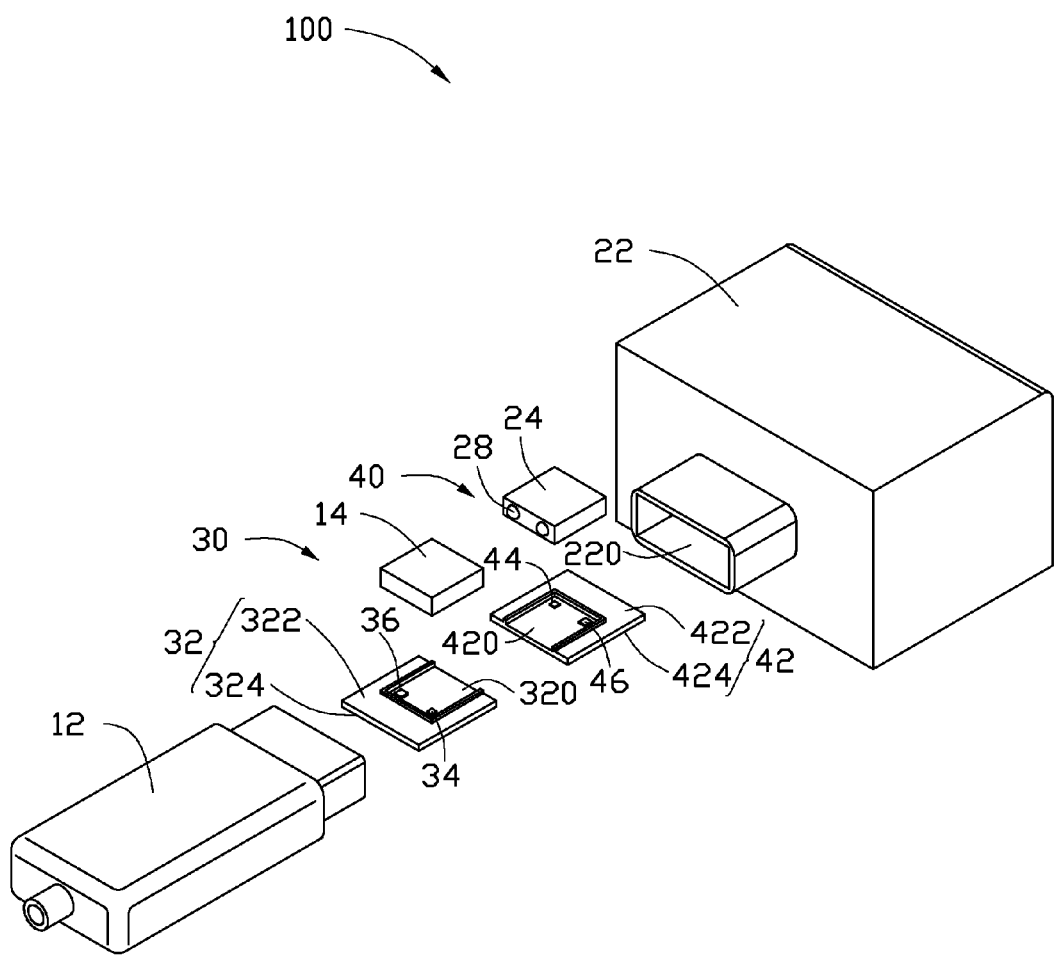
FIG. 3 is an exploded view of the optical fiber coupling assembly of FIG. 1.
Figure 4:
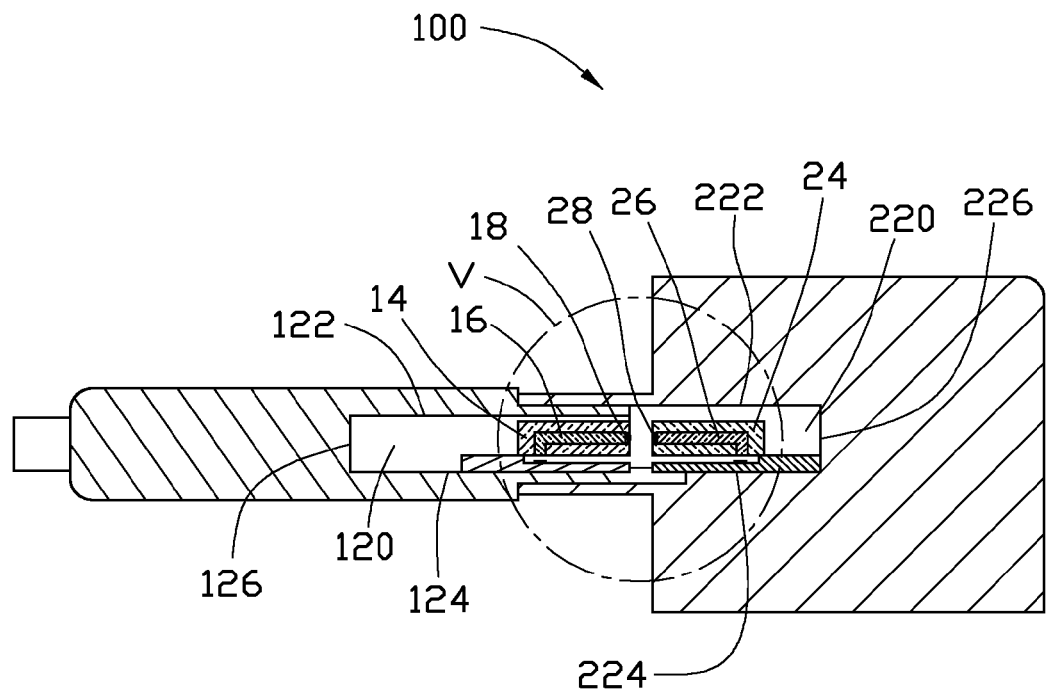
FIG. 4 is a cross-sectional view taken along line IV-IV of the optical fiber coupling assembly of FIG. 1.
Figure 5:
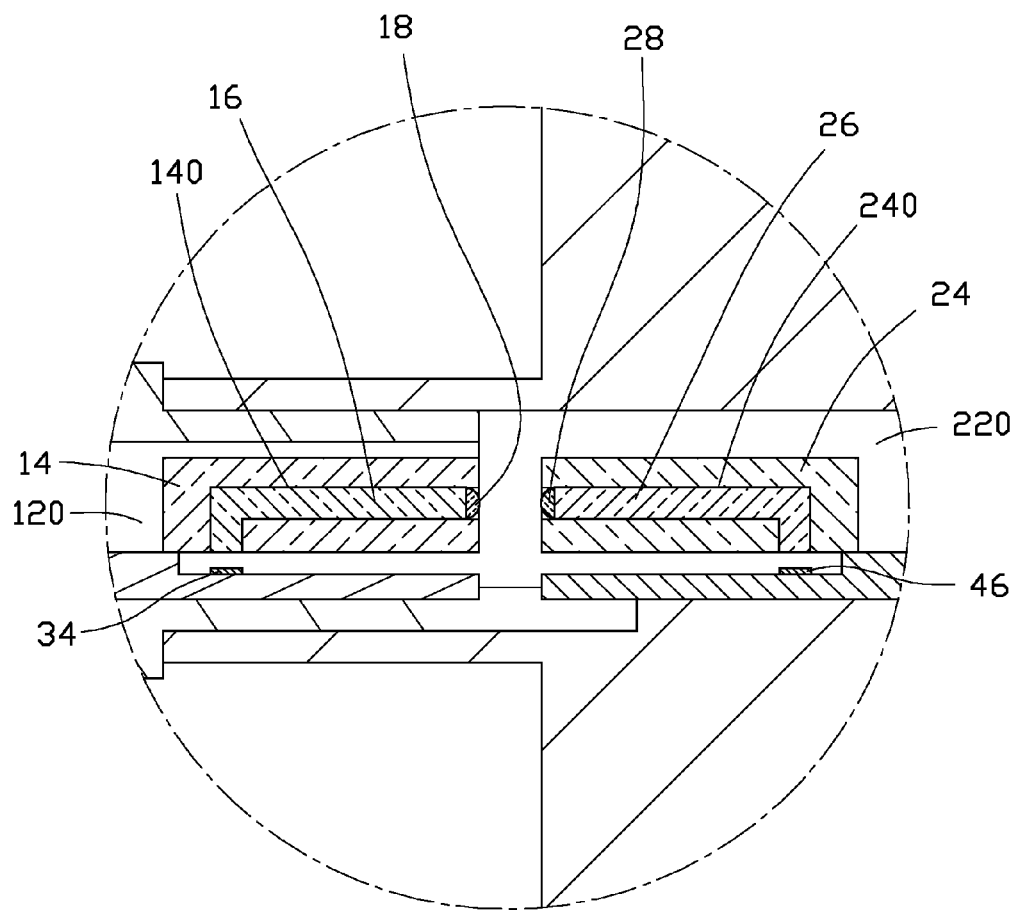
FIG. 5 is an enlarged view of section V of the optical fiber coupling assembly of FIG. 4.

Referring to FIG. 1, an optical fiber coupling assembly 100, according to an exemplary embodiment, includes a first optical fiber connector 10 and a second optical fiber connector 20. The first optical fiber connector 10 couples with the second optical fiber connector 20 to allow the passage of light in the form of digital signals.

Referring to FIGS. 2-5, the first optical fiber connector 10 includes a first body 12, a first photoelectric conversion module 30, a first receiving member 14, two first optical fibers 16, and two first optical lenses 18.

The first body 12 defines a first receiving room 120. In this embodiment, the first receiving room 120 is a rectangular blind hole. The first receiving room 120 includes a first top wall 122, a first bottom wall 124, and a first sidewall 126. The first top wall 122 is substantially parallel to the first bottom wall 124. The first sidewall 126 perpendicularly connects the first top wall 122 to the first bottom wall 124.

The first photoelectric conversion module 30, the first receiving member 14, the first optical fibers 16, and the two first optical lenses 18 are received in the first receiving room 120.

The first photoelectric conversion module 30 includes a first base 32, a first light emitting unit 34, and a first light receiving unit 36.

The first base 32 includes an upper surface 322 and a lower surface 324 opposite to the upper surface 322. A first recess 320 is defined in the upper surface 322. The lower surface 324 is supported by the first bottom wall 124.

The first light emitting unit 34 and the first light receiving unit 36 are positioned in the first recess 320 and apart from each other. In this embodiment, the first light emitting unit 34 is a vertical cavity surface emitting laser diode (VCSEL) and is configured for emitting light. The first light receiving unit 36 is a photo diode and is configured for receiving light.

The first receiving member 14 is positioned on the upper surface 322 and covers the first recess 320. The first receiving member 14 defines two first receiving holes 140. The first receiving holes 140 each are L-shaped. One end of each of the first receiving holes 140 faces toward the upper surface 322, and is aligned with the first light emitting unit 34 or the first light receiving unit 36, the other end of each of the first receiving holes 140 faces toward the second optical fiber connector 20.

The first optical fibers 16 each are L-shaped and received in the respective first receiving holes 140. One end of one of the two first optical fibers 16 is aligned with the first light emitting unit 34. One end of the other first optical fiber 16 is aligned with the first light receiving unit 36.

The first optical lenses 18 are formed on the first receiving member 14 and are apart from each other. The first optical lenses 18 are aligned with the other ends of the two first optical fibers 16, respectively.

The second optical fiber connector 20 includes a second body 22, a second photoelectric conversion module 40, a second receiving member 24, two second optical fibers 26, and two second optical lenses 28.

The second body 22 defines a second receiving room 220 corresponding to the first receiving room 120. In this embodiment, the second receiving room 220 is a rectangular blind hole. The second receiving room 220 includes a second top wall 222, a second bottom wall 224, and a second sidewall 226. The second top wall 222 is substantially parallel to the second bottom wall 224. The second sidewall 226 perpendicularly connects the second top wall 222 to the second bottom wall 224.

The second photoelectric conversion module 40, the second receiving member 24, the second optical fibers 26, and the two second optical lenses 28 are received in the second receiving room 220.

The second photoelectric conversion module 40 includes a second base 42, a second light emitting unit 44, and a second light receiving unit 46.

The second base 42 includes a top surface 422 and a bottom surface 424 opposite to the top surface 422. A second recess 420 is defined in the top surface 422. The bottom surface 424 is supported by the second bottom wall 224.

The second light emitting unit 44 and the second light receiving unit 46 are positioned in the second recess 420 and apart from each other. In this embodiment, the second light emitting unit 44 is a vertical cavity surface emitting laser diode (VCSEL) and is configured for emitting light. The second light receiving unit 46 is a photo diode and is configured for receiving light.

The second receiving member 24 is positioned on the top surface 422 and covers the second recess 420. The second receiving member 24 defines two second receiving holes 240. The second receiving holes 240 each are L-shaped. One end of each of the second receiving holes 240 faces toward the top surface 422, and is aligned with the second light emitting unit 44 or the second light receiving unit 46, the other end of each of the second receiving holes 240 faces toward the first optical fiber connector 10.

The second optical fibers 26 each are L-shaped and received in the respective second receiving holes 240. One end of one of the two second optical fibers 26 is aligned with the second light emitting unit 44. One end of the other second optical fiber 26 is aligned with the second light receiving unit 46.

The second optical lenses 28 are formed on the second receiving member 24 and are apart from each other. The second optical lenses 28 are aligned with the other ends of the two second optical fibers 26, respectively.

In assembly, the first optical fiber connector 10 is inserted into the second optical fiber connector 20. The first top wall 122 contacts the second top wall 222. The second bottom wall 224 contacts the first bottom wall 124. The first receiving room 120 is aligned with the second receiving room 220. The first receiving member 14 is aligned with the second receiving member 24. The first optical lenses 18 are aligned with the respective second optical lenses 28.

When in use, if the first optical fiber connector 10 is used as a signal emitting terminal, and the second optical fiber connector 20 is used as a signal receiving terminal, light emitted from the first light emitting unit 34 passes through the corresponding first optical fiber 16, the corresponding first optical lens 18, the corresponding second optical lens 28, and the corresponding second optical fiber 26, and reaches the second light receiving unit 46. During this process, the first light emitting unit 34 is directly coupled with the first optical fiber 16, and the second optical fiber 26 is directly coupled with the second light receiving unit 46, therefore, the optical coupling efficiency between the optical fiber 16/26 and the light emitting unit 34/light receiving unit 46 increases.

Similarly, if the first optical fiber connector 10 is used as a signal receiving terminal, and the second optical fiber connector 20 is used as a signal emitting terminal, light emitting from the second light emitting unit 44 passes through the corresponding second optical fiber 26, the corresponding second optical lens 28, the corresponding first optical lens 18, and the corresponding first optical fiber 16, and reaches the first light receiving unit 36. During this process, the second light emitting unit 44 is directly coupled with the second optical fiber 26, and the first optical fiber 16 is directly coupled with the first light receiving unit 36, therefore, the optical coupling efficiency between the optical fiber 26/16 and the light emitting unit 44/light receiving unit 36 increases.

In another embodiment, the first optical lenses 18 may be omitted, and the second optical lenses 28 may be omitted. As a result, the first optical fibers 16 are directly coupled with the respective second optical fibers 26, and the optical coupling efficiency of the optical fiber coupling assembly 100 is further increased. In addition, the first receiving member 14 may be attached on the first top wall 122 with adhesive and faces toward the first recess 320, and the second receiving member 24 may be attached on the second top wall 222 and faces toward the second recess 420.

Even though numerous characteristics and advantages of the present embodiments have been set fourth in the foregoing description, together with details of the structures and functions of the embodiments, the disclosure is illustrative only, and changes may be made in details, especially in the matters of shape, size, and the arrangement of parts within the principles of the disclosure to the full extent indicated by the broad general meaning of the terms in which the appended claims are expressed.

What is claimed is:

1. An optical fiber coupling assembly comprising:
   a first optical fiber connector comprising:
      a first body;
      a first photoelectric conversion module received in the first body, the first photoelectric conversion module comprising a first base, a first light emitting unit, and a first light receiving unit, the first light emitting unit and the first light receiving unit mounted on the first base;
      a first receiving member disposed over the first light emitting unit and the first light receiving unit, the first receiving member defining two first L-shaped receiving holes, and
      two first L-shaped optical fibers received in the respective first receiving holes, one end of one of the two first optical fibers optically aligned and coupled with the first light emitting unit, one end of the other first optical fiber optically aligned and coupled with the first light receiving unit; and
   a second optical fiber connector comprising:
      a second body, the first body partially received in and surrounded by the second body;
      a second photoelectric conversion module received in the second body, the second photoelectric conversion module comprising a second base, a second light emitting unit, and a second light receiving unit, the second light emitting unit and the second light receiving unit fixed on the second base;
      a second receiving member disposed over the second light emitting unit and the second light receiving unit, the second receiving member defining two second L-shaped receiving holes; and
      two second L-shaped optical fibers received in the respective second receiving holes, one end of one of the two second optical fibers optically aligned and coupled with the second light emitting unit, and one end of the other second optical fiber optically aligned and coupled with the second light receiving unit, the first optical fibers optically aligned and coupled with the respective second optical fibers.

2. The optical fiber coupling assembly as claimed in claim 1, wherein the first optical fiber connector further comprises two first optical lenses aligned with the respective first optical fibers, the second optical fiber connector further comprises two second optical lenses aligned with the respective second optical fibers, and the first optical lenses are aligned with the respective second optical lenses.

3. The optical fiber coupling assembly as claimed in claim 2, wherein the first optical lenses are formed on the first receiving member, and the second optical lenses are formed on the second receiving member.

4. The optical fiber coupling assembly as claimed in claim 3, wherein the first body defines a first receiving room, the first photoelectric conversion module and the first receiving member are received in the first receiving room, the second body defines a second receiving room, and the second photoelectric conversion module and the second receiving member are received in the second receiving room.

5. The optical fiber coupling assembly as claimed in claim 4, wherein the first base comprises an upper surface and an opposing lower surface, a first recess is defined in the upper surface, the first light emitting unit and the first light receiving unit are received in the first recess, and the first receiving member is supported by the upper surface and covers the first recess.

6. The optical fiber coupling assembly as claimed in claim 5, wherein the second base comprises a top surface and an opposing bottom surface, a second recess is defined in the top surface, the second light emitting unit and the second light receiving unit are received in the second recess, and the second receiving member is supported by the top surface and covers the second recess.

7. The optical fiber coupling assembly as claimed in claim 4, wherein the first base comprises an upper surface and an opposing lower surface, a first recess is defined in the upper surface, the first light emitting unit and the first light receiving unit are received in the first recess, and the first receiving member is spaced from the upper surface and faces the first recess.

8. The optical fiber coupling assembly as claimed in claim 7, wherein the second base comprises a top surface and an opposing bottom surface, a second recess is defined in the top surface, the second light emitting unit and the second light receiving unit are received in the second recess, and the second receiving member is spaced from the top surface and faces the second recess.

9. The optical fiber coupling assembly as claimed in claim 4, wherein the first receiving room is a rectangular blind hole, the first receiving room comprises a first top wall, a first bottom wall, and a first sidewall, the first top wall is substantially parallel to the first bottom wall, and the first sidewall perpendicularly connects the first top wall to the first bottom wall.

10. The optical fiber coupling assembly as claimed in claim 4, wherein the second receiving room is a rectangular blind hole, the second receiving room comprises a second top wall, a second bottom wall, and a second sidewall, the second top wall is substantially parallel to the second bottom wall, and the second sidewall perpendicularly connects the second top wall to the second bottom wall.

* * * * *